Feb. 9, 1960 O. A. HOLLAND 2,924,465
SELF-COUPLING FIFTH WHEEL
Filed Feb. 25, 1959 2 Sheets-Sheet 2

INVENTOR.
OSWALD A. HOLLAND
BY
Arthur L. Collins
ATTORNEY

2,924,465
SELF-COUPLING FIFTH WHEEL
Oswald A. Holland, Atco, N.J.

Application February 25, 1959, Serial No. 795,563

4 Claims. (Cl. 280—434)

(Granted under Title 35, U.S. Code (1952), sec. 266)

The invention described herein may be manufactured and used by or for the Government of the United States of America for governmental purposes without the payment of any royalties thereon or therefor.

This invention relates to fifth-wheel devices and is a continuation-in-part of applicant's copending application Serial Number 612,902, filed September 28, 1956, and since abandoned.

In prior art devices and in applicant's prior fifth-wheel device described in Patent No. 2,850,292, it is possible to engage and lock the cab or truck to the trailer improperly, so that upon any jar to the truck or trailer the coupling will disengage thereby separating the cab from the trailer while the vehicle is still in motion. Such an occurrence not only creates a severe occupational hazard to the truck drivers but also creates a hazard to any pedestrians or other motorists who may be in the vicinity of the motor carrier during the mishap.

It is an object of this invention therefore to provide a fifth wheel unit which cannot become improperly coupled.

Another object of this invention is to provide a fifth wheel unit which when engaged for towing is always positively locked and so cannot be accidentally disengaged by any jar, bounce or the like.

A further object of this invention is an improvement upon existing "shur-coupling" units allowing such existing units to be modified without any expensive modification or alteration.

These and other objects will be readily apparent from an examination of the following specification and the attached drawings wherein:

Figure 5 is an exploded view of the fifth wheel.

Figure 1:
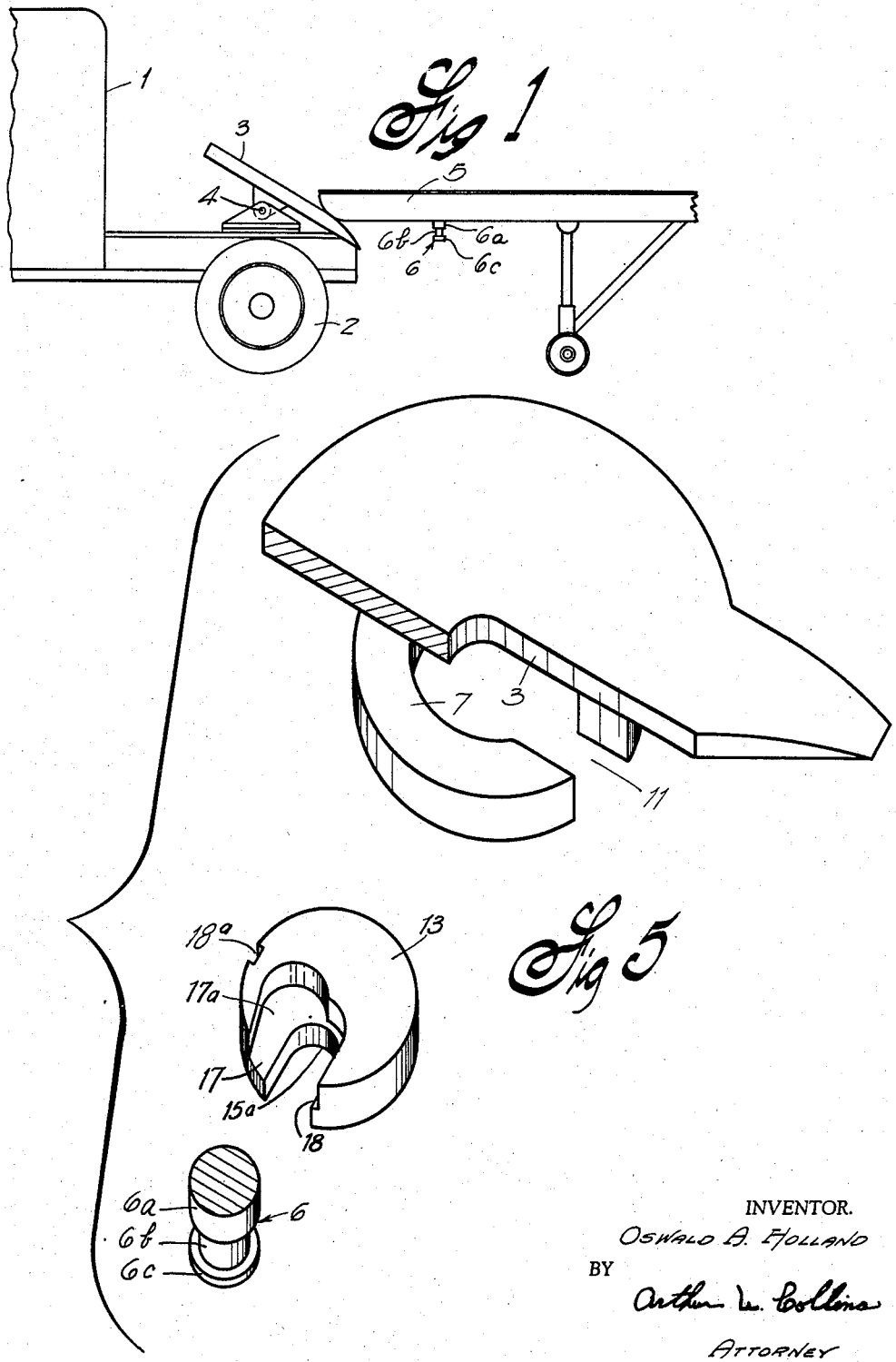
Figure 1 is a fragmental side elevation of the interconnecting parts of a tractor and trailer prior to being coupled.

Referring to the drawings, Fig. 1 shows the rear portion of a truck 1 equipped with the usual rear drive wheels 2. The saddle plate or the like 3 in which the coupling mechanism described hereinafter is located is pivotably attached to the truck section as shown at 4. The forward extremity of the trailer assembly 5 is provided with the kingpin 6 which includes the upper portion 6a, the reduced diameter portion 6b and the flanged lip 6c. Kingpin 6 engages and locks on the saddle plate 3 in a manner which will be more apparent hereinafter.

As shown in Figure 5 the annular flange 7 is integrally attached to and extends downwardly from the lower surface of saddle plate 3. Flange 7 is preferably positioned on plate 3 such that its axis of symmetry intersects radius 8 of plate 3 at a point 9 which is displaced from the center 10 of the plate a distance slightly greater than the radius of the reduced diameter portion 6b of kingpin 6. The slot 11, which is slightly wider than the diameter of the upper portion 6a of kingpin 6, extends as shown from the center of plate 3 along a radial axis 12 through the full thickness of plate 3 and flange 7 to the peripheral edge of plate 3. As shown in the drawing the longitudinal axis 12 of slot 3 is preferably substantially normal to radius 8 of plate 3.

Figure 2:
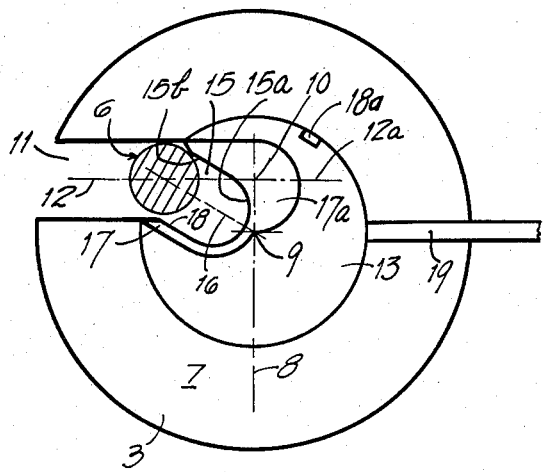
Figure 2 is a plan view of the fifth wheel wherein the saddle plate is removed and the kingpin is disengaged.

Locking disc 13 is rotatably positioned within the flange 7 in any suitable manner such as by means of the retaining plates 14. Slot 15, which extends through the full thickness of disc 13 and which is slightly wider than the diameter of reduced diameter portion 6b of kingpin 6, extends from the approximate center of disc 9 along radius 16 through its peripheral edge. The cutaway portion 17a in an upper portion of disc 13 is slightly wider than portion 6a of kingpin 6, and its longitudinal axis 12a becomes substantially aligned with the axis 12 of slot 11 when the disc occupies the rotary position shown in Figure 2. The upper half of disc 13 is also cutaway to form the step 17 which is concentric with the edge 18 of slot 15.

Figure 4:
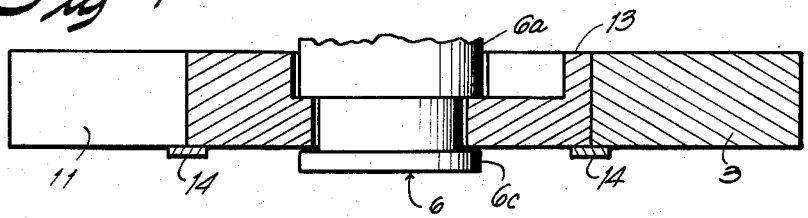
Figure 4 is a cross-sectional view along section lines 4—4 of Figure 3.
Figure 3:
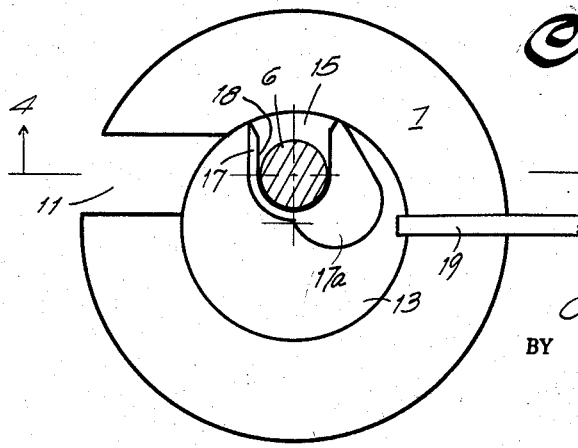
Figure 3 is a plan view of the fifth wheel wherein the saddle plate is removed and the kingpin is in its locked position.

A slot 18a on the periphery of the disc 13 is engaged by a locking pin 19 upon rotation of the disc to thereby lock the disc and kingpin in its engaged position (see Fig. 4).

The reduced disc portion 6b of kingpin 6, when properly engaged, abuts the semi-circular terminal section 15a of the slot 15, the flanged lip 6c of kingpin 6 extends beyond the lower edge of the slot 15 and the enlarged upper portion 6a of kingpin 6 engages the cutaway step 17 in disc 13 thereby preventing vertical movement of the kingpin 6 out of the slot 15.

In operation, the kingpin 6 passes through the radial slot 11 in the plate 3 and makes contact with the edge 15b in slot 15. The disc 13 because of the tangential force applied to the edge 15b of slot 15 in disc 13 is rotated and locked in the position of Figure 4. In prior art devices without the cutaway portion 17a in the disc 13 the lip 6c of the kingpin 6 instead of riding underneath slot 11 oftentimes rode on the step 17 of the disc 13. This would cause the disc to rotate to its presumed locked position with the lip 6c of the kingpin resting on step 17 instead of against the lower surface of disc 13. In this position with the truck occasioning any slight jar in passing over a bump, kingpin 6 was free to move vertically upward and out of the slot thereby separating the truck from the trailer.

To remedy this situation, the instant application teaches the utility of the generally semi-circular cutaway section 17a disposed in the upper half of disc 13. The effect of this additional cutaway in the top half of the disc 13 is such that if, through inadvertence, enlarged lip 6c rides in the upper section of the disc, it will pass through the slot 11 and into the semi-circular cutaway section 17a and kingpin 6 will engage the semi-circular end of slot 11 in saddle plate 3 before disc 13 can be operated to its locked position. Therefore, when the truck pulls forward from the trailer, kingpin 6 freely passes out of slot 11 again without coupling the tractor and trailer sections.

On the other hand, if kingpin 6 enters the slots 11 and 15 properly, edge 15b of slot 15 in disc 13 is engaged to thereby rotate the disc to its engaged position (Fig. 4) as described hereinbefore. Thus, the basic operation of the fifth wheel when proper engagement is made is unaffected by the additional cut-out 17a.

Obviously many modifications and variatons of the present invention are possible in the light of the above teachings. It is therefore to be understood that within the scope of the appended claims the invention may be practiced otherwise than as specifically described.

What is claimed is:

1. In a fifth wheel assembly for a truck and trailer a saddle plate mounted on the truck; an annular flange integrally attached to the plate and extending downwardly therefrom, said saddle plate and integral flange having an elongated entrance slot which extends from a portion of the plate within the flange through the full thickness of the plate and flange to the peripheral edge of the plate, the longitudinal axis of the slot being displaced a predetermined distance from the diameter of the flange which is parallel to the axis of the slot; a locking disc rotatably mounted within the flange, said disc having a slot which extends through the full thickness of the disc along a radius thereof that forms a predetermined acute angle with the axis of the entrance slot when the disc occupies one rotary position, an upper cross-sectional portion of said disc also being cutaway along a longitudinal axis which is in substantial alignment with the axis of said entrance slot when the disc occupies its said one rotary position; and means for locking the disc with respect to the flange when the disc rotates a predetermined angle from its said one rotary position.

2. A claim according to claim 1 wherein the said disc slot includes a concentric cutaway step in the said upper cross-sectional portion of the disc.

3. A fifth wheel assembly for a truck and trailer comprising a kingpin attached to and depending downwardly from the trailer, said kingpin having an upper enlarged diameter portion, an intermediate reduced diameter portion, and a lower enlarged diameter lip portion; a saddle plate mounted on the truck; an annular flange integrally attached to the plate and extending downwardly therefrom, said saddle plate and integral flange having an elongated entrance slot which receives said enlarged upper portion and extends from a portion of the plate within the flange through the full thickness of the plate and flange to the peripheral edge of the plate, the longitudinal axis of the entrance slot being displaced a predetermined distance from the diameter of the flange which is parallel to the axis of the said slot; a locking disc rotatably mounted within the flange, said disc having a slot which extends through the full thickness of the disc along a radius thereof that forms a predetermined acute angle with the axis of the entrance slot when the disc occupies one rotary position, an upper cross-sectional portion of said disc also being cutaway along a longitudinal axis which is in substantial alignment with the axis of said slot when the disc occupies its said one rotary positon; and means for locking the disc with respect to the flange when the disc rotates a predetermined angle from its said one rotary position.

4. A claim according to claim 3 wherein the disc slot includes a concentric cutaway step in the upper cross-sectional portion of the disc.

References Cited in the file of this patent

UNITED STATES PATENTS

| | | |
|---|---|---|
| 2,072,661 | Walther et al. | Mar. 2, 1937 |
| 2,855,221 | Cochrane | Oct. 7, 1958 |